United States Patent
Aldridge

[15] 3,679,101
[45] July 25, 1972

[54] APPARATUS FOR PROPORTIONING AND MIXING PARTICULATE MATERIALS

[72] Inventor: Gerald T. Aldridge, 4500 Dearing Rd, Memphis, Tenn. 38117

[22] Filed: Sept. 5, 1968

[21] Appl. No.: 757,564

[52] U.S. Cl.............................................222/136, 222/410
[51] Int. Cl................................................................B67d 5/48
[58] Field of Search..................222/507, 509, 161, 145, 448, 222/453, 136, 368, 309, 142, 138, 410; 137/602

[56] References Cited

UNITED STATES PATENTS

| | | | |
|---|---|---|---|
| 651,010 | 6/1900 | Galloway | 222/145 |
| 2,684,785 | 7/1954 | Waldorf et al. | 222/142 X |
| 2,792,156 | 5/1957 | Camp | 222/309 |
| 3,160,318 | 12/1964 | Steiner et al. | 222/365 X |
| 3,227,325 | 1/1966 | Bates | 222/309 |
| 3,244,328 | 4/1966 | Brown | 222/136 |
| 3,367,544 | 2/1968 | Formando | 222/368 |

*Primary Examiner*—Robert B. Reeves
*Assistant Examiner*—Norman L. Stack, Jr.
*Attorney*—John R. Walker, III

[57] ABSTRACT

Apparatus for proportioning and mixing particulate or granular material and particularly for handling plastic granular material constituting the various ingredients of a granular plastic mixture or blend of material adapted to be fed into plastic extruders, blow molding plastic forming machines, or the like.

The apparatus of a basic embodiment disclosed includes at least one rotary type metering unit adapted for metering the major part or portion of the granular plastic mixture or blend and includes a smaller rotary metering unit having adjustable socket-like chambers adapted to receive a certain quantity of granular material and to dispense the material at a substantially constant rate as the apparatus is operated.

Another embodiment disclosed includes a vertically reciprocating plunger having recess means defining a measuring chamber adapted to measure a certain quantity of material and at a certain rate. The embodiment of the invention utilizing the plunger type metering means is particularly useful for metering color concentrate pellets or granules in the proportioning of the plastic granule mixture or blend. The plunger is adapted to be vertically reciprocated either by direct mechanical action utilizing a multi-lobe cam for direct vertical reciprocation of the plunger or may be pneumatically operated through a timed air valve synchronously connected with one of the large volume rotary metering means dispensing another ingredient of the plastic granule mixture.

2 Claims, 6 Drawing Figures

INVENTOR.
GERALD T. ALDRIDGE
BY John R. Walker, III
Attorney

INVENTOR.
GERALD T. ALDRIDGE
BY John R. Walker III
Attorney

APPARATUS FOR PROPORTIONING AND MIXING PARTICULATE MATERIALS

BACKGROUND OF THE INVENTION

1. Field of the Invention

Relates generally to apparatuses for proportioning dry bulk granular or particulate ingredient materials in forming a formulated blend or mixture. The apparatus is particularly intended for proportioning or mixing new, reground, used, and color concentrate plastic granules or pellets in forming a blend or mixture adapted to be fed into a plastic blow molding machine, plastic extruder type machine, or the like.

2. Description of the Prior Art

Granular plastic material proportioning apparatus with which I am familiar proportions the several ingredients of a plastic mixture by intermittently cyclically dumping measured quantities of the material into a common hopper or bin. U.S. Pat. No. 3,312,374 issued Apr. 4, 1967, discloses plastic granule metering and measuring apparatus of the above-mentioned type. The metering and measuring apparatus of U.S. Pat. No. '374 includes a plurality of metering units each being adapted to meter or measure a granular ingredient of the plastic blend or mixture. The machine includes an air cylinder for vertical reciprocation of the measuring means and a mixture is compiled by intermittently dumping the ingredients. A disadvantage of the metering and measuring apparatus of U.S. Pat. No. '374 is that the output of the apparatus is somewhat limited by the intermittent reciprocative movement or principle of operation of the apparatus.

SUMMARY OF THE INVENTION

The preferred embodiment of the apparatus of the present invention includes rotary type material dispensing means and such means adapted for dispensing or metering the granular plastic material at a selected substantially constant rate. The plastic granules of the several ingredients of a granular plastic mix may be smoothly and substantially continuously metered or dispensed into a common hopper as normal gravitational action on the plastic granules. The proportion of each ingredient of the granular plastic mix may be accurately controlled in the following manner: (1) By regulating the speed or rate of actuation relatively between two or more ingredient-dispensing units of the apparatus and (2) by adjusting or regulating the volume of the color concentrate plastic granules dispensed by the color concentrate unit.

In plastic blow molding or extruding operations it is desirable to mix a proportion of virgin or new pellets or granules to a proportion of reground pellets or granules and also to mix a small proportion of color concentrate granules to the new and reground pellet ingredients. A common plastic granule mixture may be 49 percent virgin material, 49% reground or used material and 2 percent color concentrate material. The action of the present invention is such that the materials may be dispensed from each ingredient dispensing unit at a selected substantially constant rate and without intermittent or periodic action. The substantially constant or continuous flow of material through the apparatus increases substantially its total output as compared with prior art cycling apparatus and provides an apparatus of substantially greater capacity. The proportioning and mixing apparatus of the present invention is also less complex than comparable prior art apparatus and is cheaper to manufacture and maintain.

DESCRIPTION OF THE PREFERRED EMBODIMENTS

Figure 1:
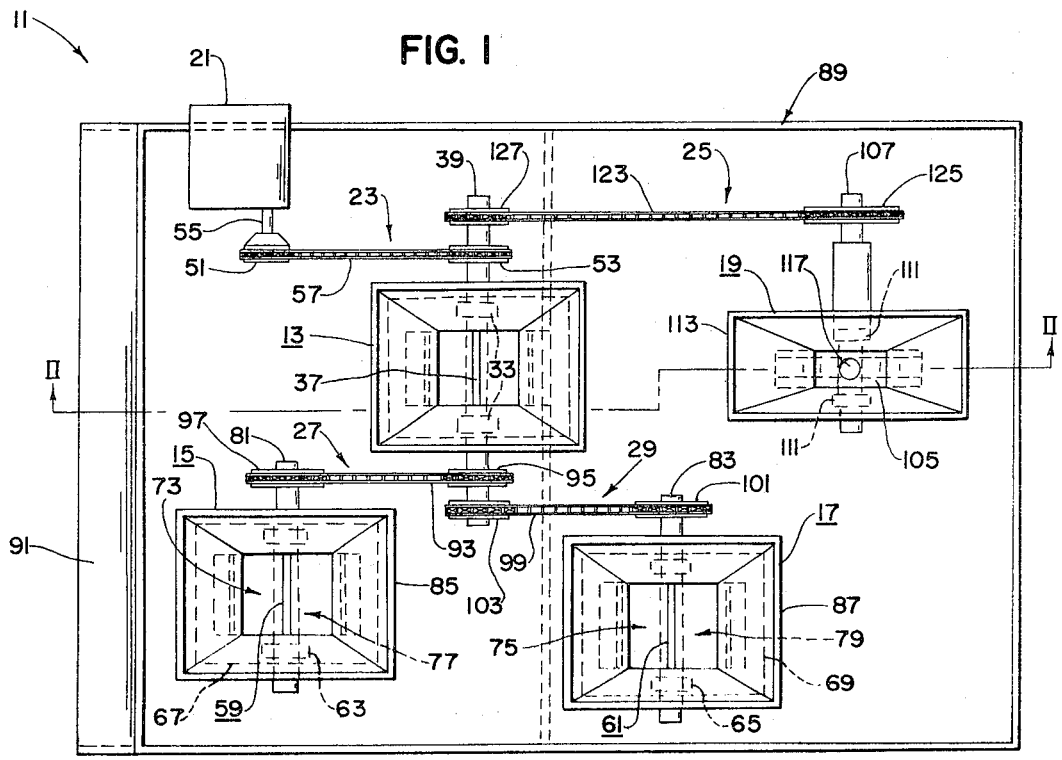
FIG. 1 is a plan view of the proportioning and mixing apparatus of the present invention.
Figure 2:
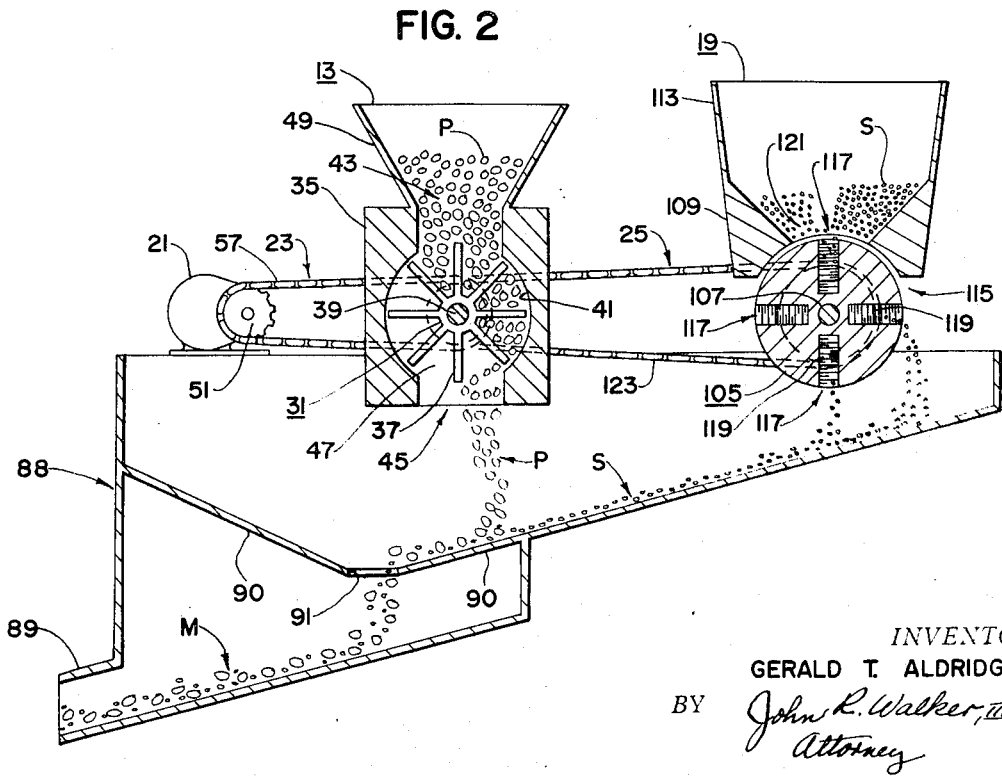
FIG. 2 is a vertical plane sectional view of the apparatus taken as on the line II—II of FIG. 1 and illustrating also granular plastic material being processed.

A first embodiment of the invention is indicated by numeral 11 and shown in FIGS. 1 and 2 and includes basically the following parts: Primary ingredient means including first, second and third metering units 13, 15, 17 each adapted respectively for metering an ingredient of the granular plastic material mix M; secondary ingredient metering means including a metering unit 19; motor means 21; first drive means 23 operably connecting motor means 21 and primary ingredient metering unit 13; second drive means 25 operably connecting primary ingredient metering unit 13 and secondary ingredient metering unit 19; and third drive means 27, 29 interconnecting respectively primary ingredient metering means 13, 15, 17.

The primary ingredient means including metering units 13, 15, 17 are operable for metering the body or major portion of mixture M. It will be understood that the number of primary ingredient metering units 13, 15, 17 may be varied to suit the particular application of the invention. In most cases only two of the units will be provided, namely, unit 13 for dispensing virgin pellet or granular plastic material and unit 15 for dispensing reground pellet or granular plastic material. Unit 17 will be provided, if desired, for dispensing a different type of plastic. The material dispensed by units 13, 15, 17 constitutes the main body portion of the granular plastic mix M. Secondary metering unit 19 is a unit of less capacity than each of primary ingredient units 13, 15, 17 and is adapted for metering color concentrate pellets or granules indicated S.

Primary ingredient metering units 13, 15, 17 preferably are alike in size and configuration and each is generally in the form of a rotary type feeder or dispensing mechanism. Metering unit 13 includes a rotor 31 journalled on bearings 33 in housing structure 35. Rotor 31 includes a plurality of equiangularly arranged blades projecting radially from a shaft 39 mounted in bearings 33. Housing 35 is open vertically and includes an intermediate portion which houses rotor 31 and such portion defining an interior plane curve surface 41 arranged in close tolerance relationship with the path of the distal edge portions of rotor blades 37 (see FIG. 2). Housing 35 includes structure defining an intake opening 43 and a discharge opening 45 respectively arranged directly over and under rotor 31 and adapted respectively for conducting primary ingredient granules P through rotor 31 and housing structure 35. Rotor 31 is adapted to move clockwise, as viewed in FIG. 2, and to meter a measured quantity of granules P through discharge opening 45; each of the trough-like spaces 47 between adjacent blades 37 of rotor 31 is adapted to contain a measured quantity of granules P and to convey the granules in an arced movement through housing 35. Hopper structure 49 arranged upwardly and circumferentially around discharge opening 45 of housing 35 is adapted to temporarily hold a quantity of granules P; the granules are adapted to be held in hopper structure 49 and to be fed downwardly through opening 43, through rotor 31 and discharge opening 45.

First drive means 23 preferably includes drive and driven sprocket wheels 51, 53 fixedly secured respectively on motor shaft 55 and rotor shaft 39 and includes a chain 57 drivingly coupling the sprocket wheels. Prime mover 21 preferably is of a variable speed type unit, as for example, a motor reducer combination with an electrical clutch adapted for driving rotor 31 at a selected constant speed.

Primary ingredient metering units 15, 17 each are alike and correspond substantially with metering unit 13 and include respectively rotor members 59, 61; bearing means 63, 65; housing means 67, 69 having respectively intake and discharge openings 73, 75, 77, 79; rotor shafts 81, 83; and hopper structure 85, 87. Metering unit 15 is adapted for conveying and metering reground plastic granule material P from hopper structure 85 downwardly through rotor 59 and discharge opening 77. In like manner, metering unit 17 is adapted for metering and conveying a different type plastic granule material P downwardly from hopper structure 87, through rotor 61 and downwardly through discharge opening 79. A large mixing hopper 88 is subjacently arranged respectively under the discharge openings of metering units 13, 15, 17 and is adapted for receiving and mixing primary ingredient granules P issuing from metering unit 13, 15, 17 into mixture M which passes outwardly through spout 89 for further processing. Hopper 88 is provided with a curved and sloping funnel-like portion 90 directly below metering units 13, 15, 17, 19 which has an aperture 91 in the bottom thereof through which the mixture M passes downwardly to 1 spout 89 so that the granules or pellets will be well mixed. Although not shown in the other embodiments depicted in FIGS. 3 – 6, it will be understood that if desired the same type portion as portion 90 with aperture 91 may be provided.

Third drive means 27 interconnecting first and second metering units 13, 15 in positive drive connection preferably includes chain and sprocket means 93, 95, 97. In like manner, third drive means 29 interconnecting first and third metering units 13, 17 preferably includes chain and sprocket drive means 99, 101, 103. The chain and sprocket means of third drive means 27, 29 are adapted to be adjustably manipulated respectively for adjusting or varying the ratio of rotation respectively between first and second metering units 13, 15 and second and third metering units 13, 17. Also, by adjustably manipulating the chain and sprocket means respectively of third drive means 27, 29 the ratio or rate of metering respectively between metering units 15, 17 may be varied; by adjusting the ratio respectively between either or both drive means 27, 29 the first, second and third metering units 13, 15, 17 may be adjusted for dispensing desired proportions or ingredients of mixture M.

Secondary ingredient metering means adapted for metering the color concentrate granules S in apparatus 11 is a rotary type unit and includes a disk-like metering rotor 105 mounted on rotor shaft 107 rotatively secured in housing 109 on bearings 111. Hopper structure 113 superjacently secured on housing 109 is adapted to temporarily hold secondary ingredient granules S for feeding the granules through metering rotor 105 and downwardly through discharge opening 115 of housing 109. Rotor 105 preferably is provided with a plurality of socketlike measuring chambers 117 opening radially outwardly and uniformly spaced about the circumferential periphery of rotor 105. The bottom of each measuring chamber 117 is preferably adjustable radially of rotor 105 and preferably formed substantially by adjustable plugs 119 threadedly secured respectively in threaded bore openings extending radially in rotor 105.

Upon clockwise rotation of rotor 105 (as viewed in FIG. 2), the plurality of metering chambers 117 are adapted to sequentially be in communication respectively with intake opening 121 and discharge opening 115 of housing 109. Each measuring chamber is adapted to be in communication alternatingly cyclically with the intake and discharge openings of housing 109 and to convey a measured amount of granules S through metering unit 19. Uniformly adjustably manipulating respectively plugs 119 regulates the capacity or output of metering unit 19.

Second drive means 25 preferably includes chain and sprocket wheel means 123, 125, 127 connecting in positive drive connection, rotor shaft 107 of secondary ingredient metering unit 19 with rotor shaft 39 of primary ingredient metering unit 13. Swapping sprocket wheels 127, 125 respectively on shafts 39, 107, or changing the effective diameters respectively of the sprocket wheels changes the speed of rotor 105 of metering unit 19 or the relative speed of rotor 105 and rotor 31 for adjusting the output of metering unit 19.

Secondary ingredient granules S dropping from discharge opening 115 falls on funnel-like portion 90 of mixing hopper 89. Granules S are gravitatingly conveyed downwardly in portion 90 and are mixed with granules P issuing from primary ingredient metering units 13, 15, 17 and form mixture M. The mixture is conducted through aperture 91 and spout 89 for heating and melting or for further processing.

By adjustably regulating the rotor speeds respectively of first, second and third primary ingredient metering units 13, 15, 17 and secondary ingredient metering unit 19 and by adjustably varying the volume of measuring chambers 117 of rotor 105 of metering unit 19 a desired mixture M may be obtained. It will be understood that in certain embodiments of the invention it may be desirable to utilize positive drive stepped belt and pulley means in lieu of the chain and sprocket means respectively of first and second drive means 23, 25 and third drive means 27, 29. Also, other drive means including meshed gear drive means may provide suitable positive power transmission means respectively between the metering units.

Figure 3:
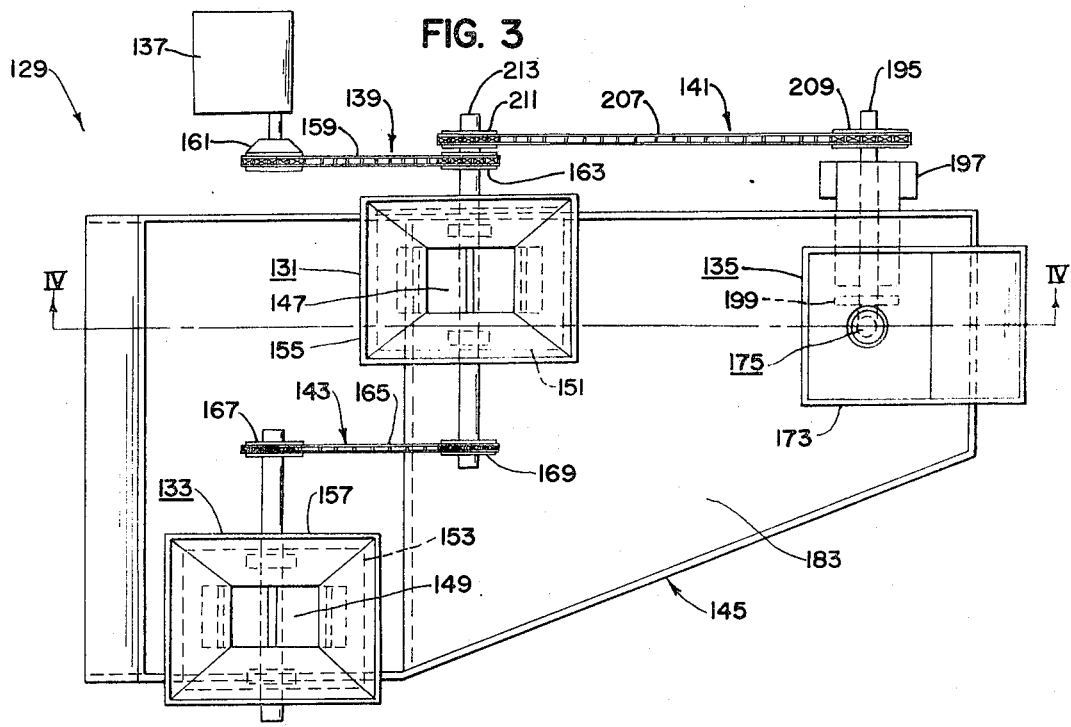
FIG. 3 is a plan view of a second embodiment of the invention.
Figure 4:
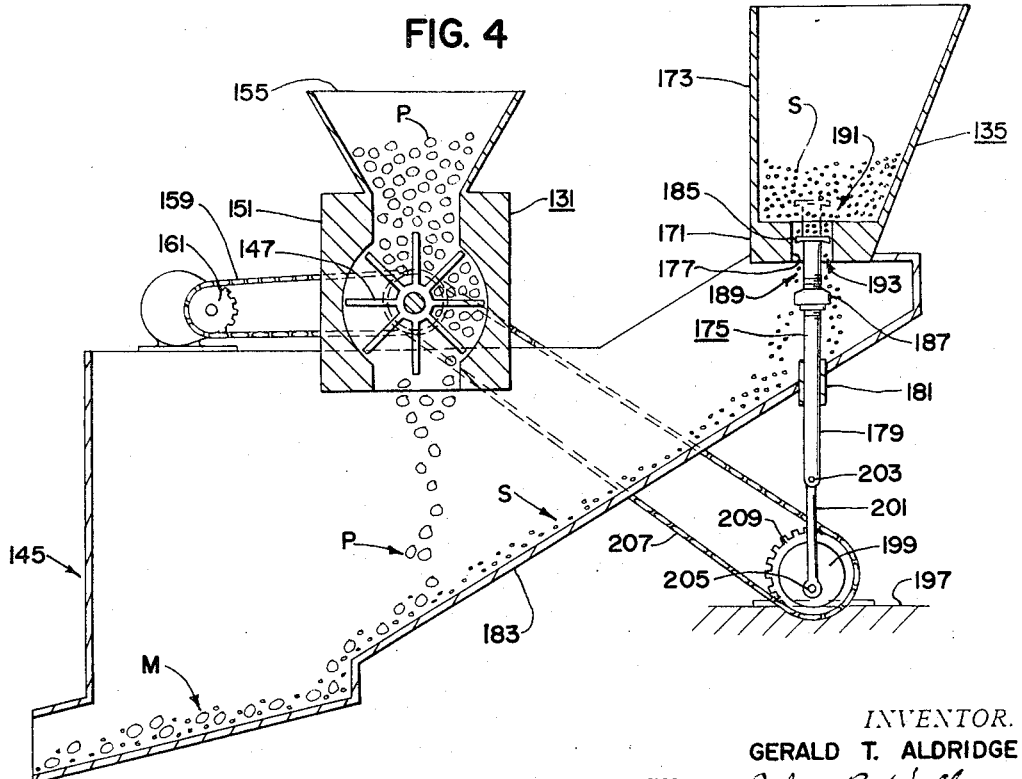
FIG. 4 is a vertical plane sectional view taken as on the line IV—IV of FIG. 3.

Apparatus 129, illustrated in FIGS. 3 and 4, illustrates a second embodiment of the invention. Apparatus 129 differs substantially from apparatus 11 in that the color concentrate metering means utilizes reciprocating plunger means rather than the rotating disk rotor (105) of the secondary ingredient metering unit (19) of apparatus 11.

Apparatus 129 basically includes primary ingredient metering means including first and second rotary metering units 131, 133; secondary ingredient metering means including a reciprocating type metering unit 135; motor or prime mover means 137; first, second and third drive means 139, 141, 143 and mixing hopper means 145.

Primary ingredient metering units 131, 133 each are alike and correspond substantially with a primary ingredient metering unit of apparatus 11. Metering units 131, 133 includes respectively rotor means 147, 149; housings 151, 153; and hopper structure 155, 157 secured superjacently respectively on housings 151, 153 adapted for holding and feeding granules P respectively through rotors 147, 149.

First drive means 139 including chain and sprocket means 159, 161, 163 drivingly interconnect prime mover means 137 with first metering unit 131. In like manner, third drive means 141 including chain and sprocket means 165, 167, 169 operatively interconnect respectively first and second metering units 131, 133.

Secondary ingredient metering unit 135 includes a housing 171, hopper structure 173 superjacently secured on housing 171 and a metering plunger 175 vertically reciprocatingly fitted in bore 177 of housing 171. Shank portion 179 of plunger 175 is reciprocatingly fitted in bushing 181 fixedly secured respectively superjacently on inclined apron portion 183 of mixing hopper 145. The upper portion of plunger 175 includes a mushroom-like head 185 defining the upper terminus of the plunger and an annular nut-like cuff 187 threadedly secured subjacently of head 185 on plunger shank 179. The relative vertical disposition respectively of head and cuff portion 185, 187 of plunger 175 is adjustable for regulating the volume of plunger measuring chamber 189. Cuff and head portions 185, 187 of plunger 175 are of like diameter and snugly but freely fitted in bore 177 of housing 171. Vertical upward movement of plunger 175 causes head 185 to move upwardly past intake opening 191 of housing 171 and permits measuring chamber 189 to be filled with secondary ingredient granules S. Downward movement of plunger 175 moves cuff 187 below discharge opening 193 of housing 171 and permits granules S to be discharged onto apron 183 of mixing hopper 145.

Second drive means 141 operably interconnecting secondary ingredient metering plunger 175 and primary ingredient metering unit 131 includes a horizontally journalled plunger drive shaft 195 stationarily journalled on support structure 197; a crank wheel 199 fixedly secured on an end of shaft 195; a connecting rod 201 articulatingly secured respectively at upper and lower end portions 203, 205 to the lower end of plunger shank 179 and the throw journal of crank wheel 199; and chain and sprocket means 207, 209, 211 connecting in positive drive connection rotor shaft 213 of first metering unit 131 and plunger drive shaft 195.

In addition to regulating the output of secondary ingredient metering unit 135 by regulating the speed of reciprocation of plunger 175, the output of metering unit 135 may be adjusted by regulating the volume of measuring chamber 189: turnably manipulating cuff 187 of plunger 175 upwardly or downwardly on shank 179 decreases or increases respectively the volume of measuring chamber 189 and regulates the quantity of color concentrate granules S metered by unit 135.

Figure 5:
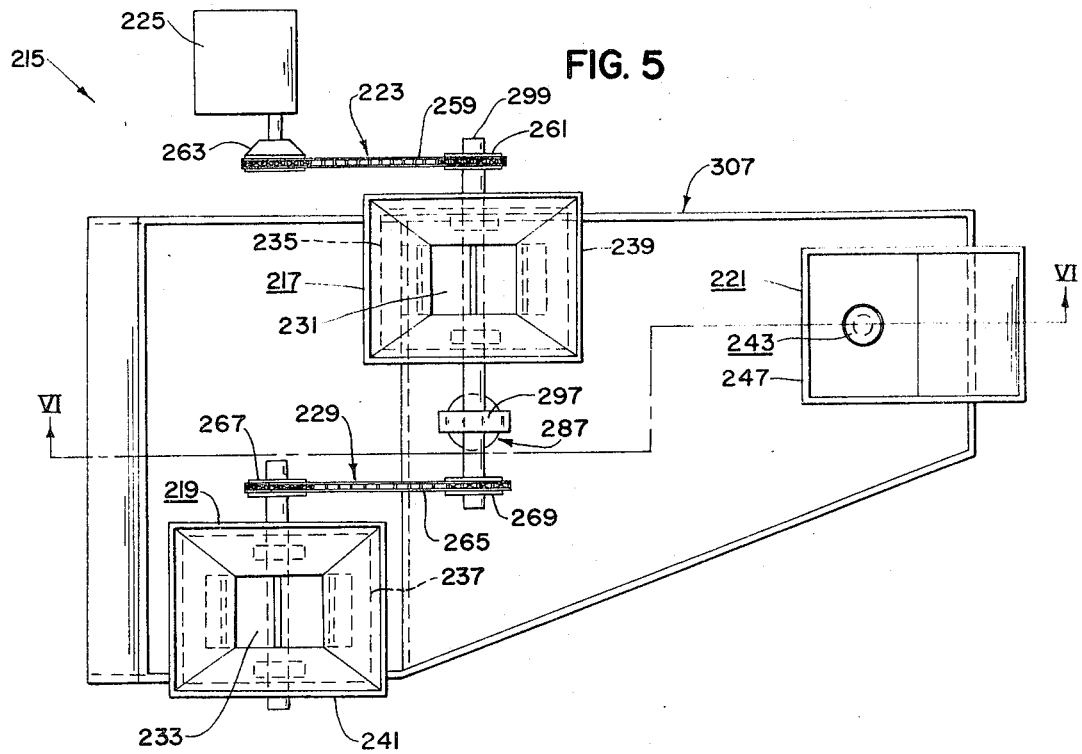
FIG. 5 is a plan view of a third embodiment of the invention.
Figure 6:
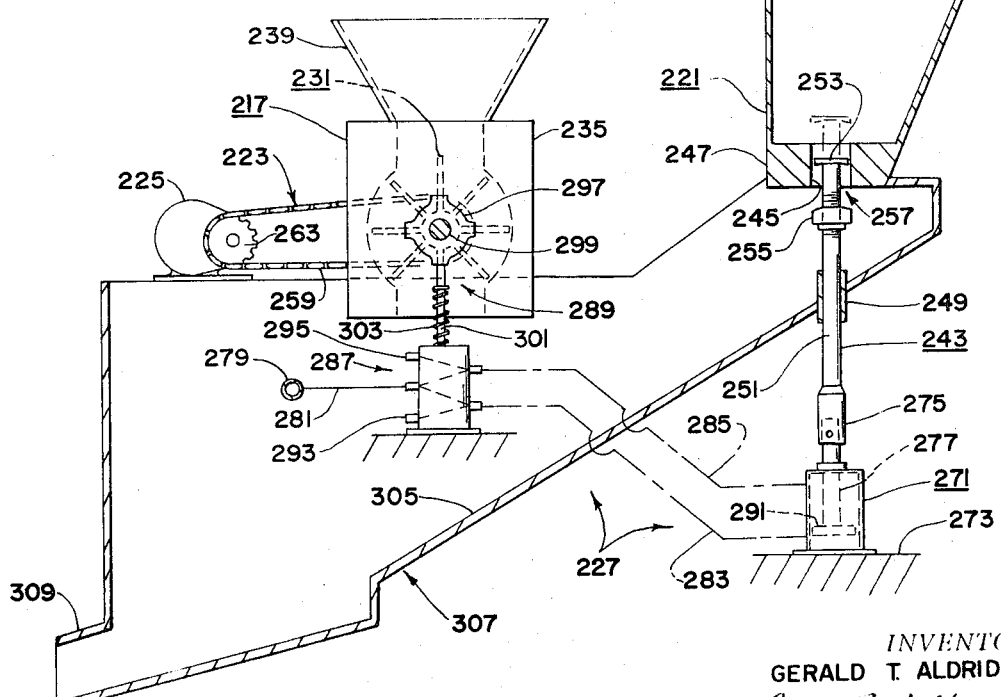
FIG. 6 is a vertical plane sectional view taken as on the line VI—VI of FIG. 5.

Apparatus 215 illustrated in FIGS. 5 and 6 is a third embodiment of the invention. Apparatus 215 basically includes primary ingredient metering means including first and second metering units 217, 219; secondary ingredient metering means including a metering unit 221; first drive means 223 operably interconnecting motor or prime mover means 225 and first metering unit 217; and second and third drive means 227, 229 interconnecting first metering unit 217 respectively with secondary ingredient metering unit 221 and primary ingredient metering unit 219.

Primary ingredient metering units 217, 219 each are alike and correspond substantially in structure and function with metering units 131, 133 of apparatus 129. Metering units 217, 219 include respectively rotor means 231, 233; housing means 235, 237; and hopper structures 239, 241 superjacently fixedly secured respectively on housing structures 235, 237. In like manner, secondary ingredient metering unit 221 of apparatus 215 corresponds substantially with metering unit 135 of apparatus 129 and includes a metering plunger 243 vertically reciprocatingly received in a bore 245 in a housing 247 and includes bushing means 249 guidingly constraining plunger shank 251. The upper end of plunger 243 includes head and cuff portions 253, 255 defining an annular measuring chamber 257. Threadedly manipulating cuff 255 axially on shank 251 is adapted for adjustably regulating the volume of measuring chamber 257 and the output of color concentrate granules.

First drive means 223 preferably includes chain and sprocket means 259, 261, 263 defining positive drive connection between prime mover means 225 and primary ingredient metering unit 217. Third drive means 229 preferably includes chain and sprocket means 265, 267, 269 interconnecting first and second metering units 217, 219.

Second drive means 227 interconnects in synchronized drive rotor 231 of primary ingredient metering unit 217 and plunger 243 of secondary ingredient metering unit 221. Second drive means 227 includes a double-acting piston-cylinder assembly 271 stationarily secured on support structure 273; coupling means 275 coupling piston rod 277 of piston-cylinder assembly 271 with plunger shank 251; an air supply line 279 connectable with a supply of compressed air; conduit means 281, 283, 285 interconnecting supply line 279 with piston-cylinder assembly 271; a reciprocative type air valve 287 interposedly arranged in conduit means 281, 283, 285; and cam operative actuating means 289 operatively interconnecting rotor 231 of metering unit 217 and air valve 287 for causing synchronous movement of plunger 243 and rotor 231. Up and down movement of the barrel or movable port parts (not shown) of air valve 287 causes air in conduit 21 to be directed through either conduit 283 or conduit 285 respectively for raising and lowering joined piston 291 and plunger 243. ExhaUst air of air valve 287 is exhausted through ports 293, 295.

Actuating means 289 controls air valve 287 and the up and down movement of plunger 243. Actuating means 289 preferably includes a multi-lobed cam 297 secured on rotor shaft 299 of metering unit 217 and includes follower rod and spring means 301, 303 operably interconnecting cam 297 and air valve 287. Up and down reciprocative movement of follower rod 301 causes compressed air to be directed alternatingly through conduits 283, 285 respectively on opposite sides of piston 291 and causes vertical reciprocation of plunger 243. With each up and down movement of plunger 243 a measured quantity of secondary ingredient granules is received in and discharged from measuring chamber 257.

Granules discharged from plunger measuring chamber 257 drop on inclined apron 305 of mixing hopper 307. The primary and secondary ingredient granules issuing respectively from primary ingredient metering units 217, 219 and secondary metering unit 221 are received and mixed in mixing hopper 307. The mixed granules are conducted through spout 309 for further processing.

I claim:

1. Apparatus for proportioning and mixing particulate or granular primary and secondary plastic ingredient materials for making a mixture of granular plastic material suitable for further procesSing comprising primary granular ingredient metering means for metering virgin or reground plastic granules used in forming the body or major mass part of the granular plastic mixture, said primary ingredient metering means including at least one primary ingredient metering unit including a radially bladed horizontally journalled rotor, housing structure defining intake and discharge openings respectively superjacently and subjacently of said rotor, prime mover means for powering said rotor, first drive means interconnecting said prime mover means and said rotor for driving said rotor at a selected constant speed, said primary ingredient metering unit upon rotation of said rotor being operative for metering a certain quantity of granular primary ingredient material gravitatingly downwardly through said rotor and out of said discharge opening of said housing structure, secondary ingredient metering means for metering color concentrate granules for use in coloring the major mass part of the mixture of the primary granular ingredient issuing from the discharge opening of said primary ingredient metering unit, said secondary ingredient metering means including a metering member having structure defining at least one small measuring chamber of a certain volume adapted to be filled and emptied cyclically alternatingly of color concentrate granules, housing structure arranged about said metering member defining intake and discharge openings arranged respectively contiguous of the measuring chamber of said metering member, mechanical action means for guidingly constraining said metering member in continuous cyclic movement and for movement of said measuring chamber into and out of communication alternatingly cyclically with said intake and discharge openings of said secondary ingredient metering means housing structure, second drive means interconnecting in drive connection the rotor of said primary ingredient metering unit and the metering member of said secondary metering means, said secondary metering means being adapted for metering a specific quantity of granular color concentrate ingredient material cyclically into and out of the metering member chamber upon each revolution of said primary ingredient metering unit rotor and downwardly gravitatingly out of the discharge opening of said secondary ingredient metering means, and mixing hopper means arranged underneath said discharge openings respectively of said primary and secondary ingredient metering means for receiving the granular material issuing from said discharge openings and for mixing the primary and secondary granular ingredient material into a proportioned mixture; said metering member means of said secondary ingredient metering means including a metering plunger, recess structure defining an annular measuring chamber arranged concentrically about the axis of said plunger, said means guidingly constraining said metering plunger including stationary bushing means mounting said plunger in a vertical disposition substantially subjacently of said discharge opening of said secondary ingredient metering means, said metering plunger being adapted to vertically move upwardly to fill said measuring chamber with plastic granules and to move downwardly to release the measured quantities of granules through said discharge opening downwardly into said hopper means, and wherein said second drive means interconnecting the rotor of said primary ingredient metering unit and said metering plunger includes a double-acting piston-cylinder assembly stationarily mounted subjacently of said plunger, link means interconnecting the lower end of said plunger with the piston of said piston-cylinder assembly for common vertical reciprocal movement of said piston and plunger, an air supply line connectable with a source of compressed air, conduit means interconnecting said air supply line and said piston-cylinder assembly, air valve means interposedly arranged in said air conduit means for directing compressed air to one side or the other side of the piston of said piston-cylinder assembly respectively for either raising or lowering said metering plunger, and including actuating means operatively interconnecting said rotor and said air valve means for causing synchronous reciprocating movement of said plunger with rotative movement of said rotor.

2. The apparatus of claim 1 wherein said air valve means is reciprocatingly operative for movement between a first position for directing air on one side of the piston of said piston-cylinder assembly and a second position for directing air on the other side of said piston, and wherein said actuating means includes a cam operatively positively drivingly connected with said rotor of said primary ingredient metering means, said cam having a plurality of lobes intermittently spaced about the circumferential periphery of said cam and arranged along a common plane of rotation, and including follower rod means operatively interposedly engageable between said cam lobes and said valve means for actuating said valve means to said first position when said follower rod is moved to a first position by a lobe of said cam and includes follower rod spring means for urging said rod against said cam at the minimum diameter of said cam and said valve to said second position, said cam being operative for causing substantially continuous alternating movement of said valve means between said first and second positions respectively for raising and lowering said metering plunger of said secondary metering means and for cyclically metering material downwardly and into said mixing hopper means.

* * * * *